Oct. 27, 1931.  C. V. WEIR  1,829,026
APPARATUS FOR PROPORTIONING THE COMPONENTS OF
AGGREGATE MATERIAL BY WEIGHT MEASUREMENT
Filed July 19, 1930  3 Sheets-Sheet 1

Inventor

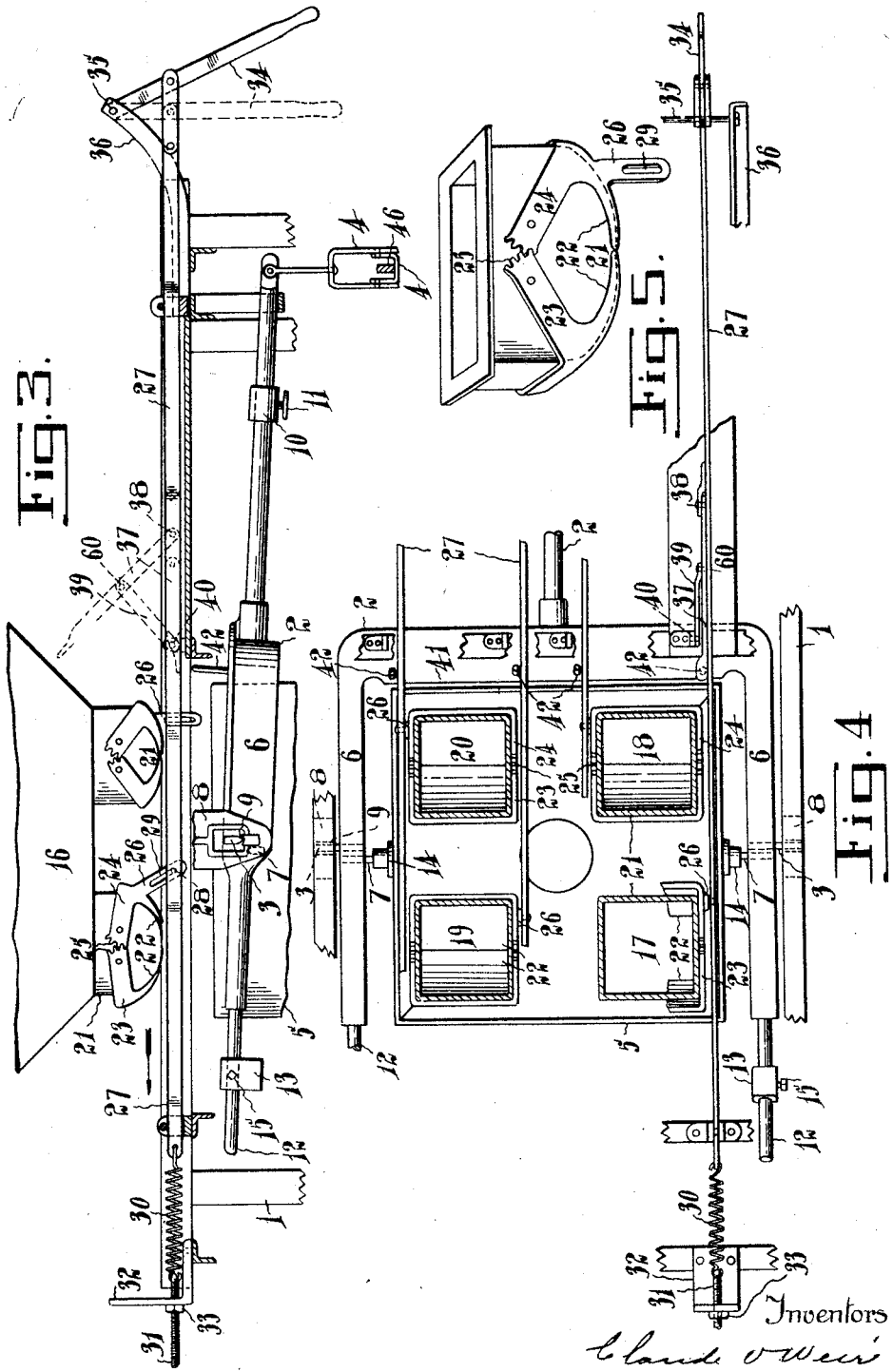

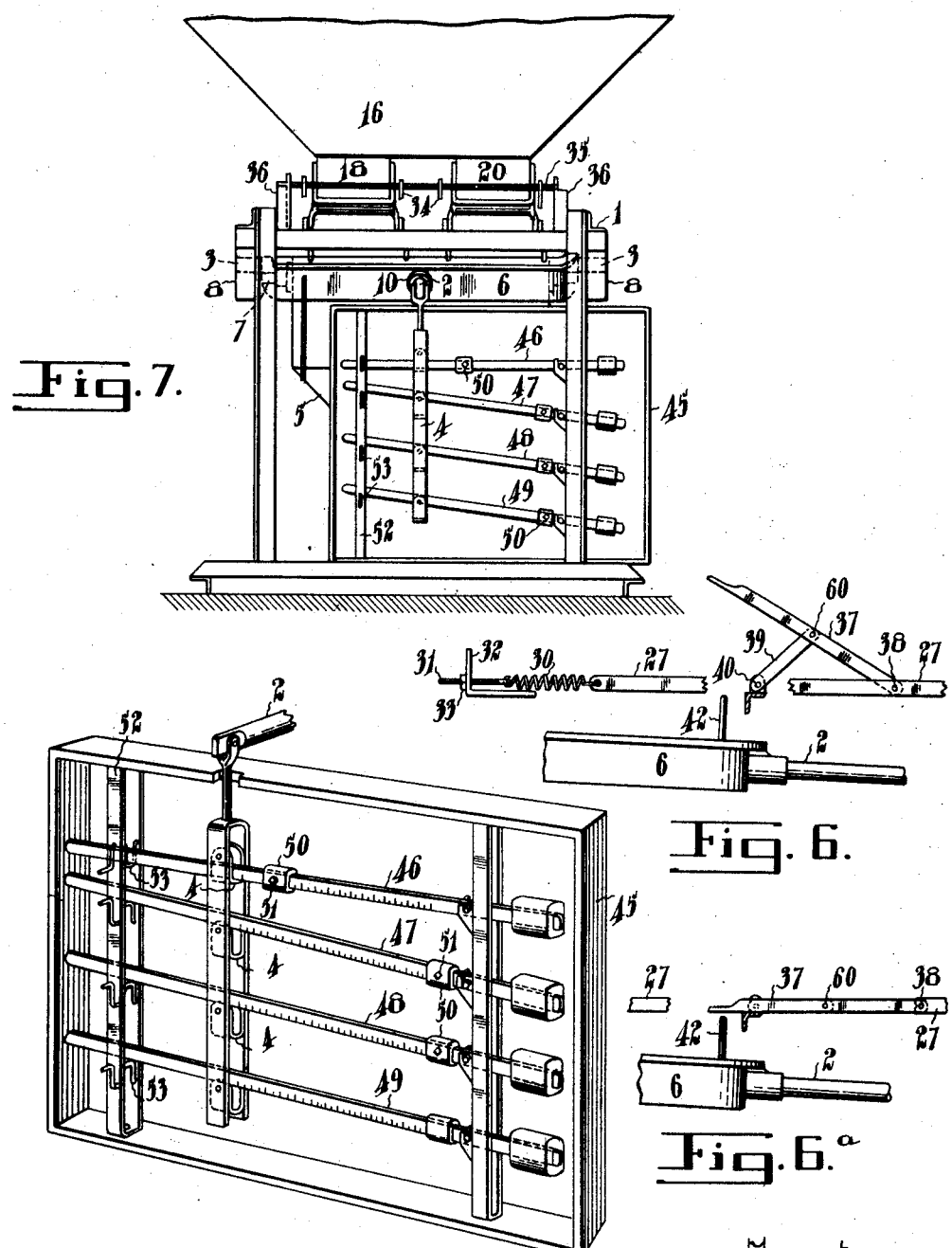

Patented Oct. 27, 1931

1,829,026

UNITED STATES PATENT OFFICE

CLAUDE V. WEIR, OF TORONTO, ONTARIO, CANADA

APPARATUS FOR PROPORTIONING THE COMPONENTS OF AGGREGATE MATERIAL BY WEIGHT MEASUREMENT

Application filed July 19, 1930. Serial No. 469,144.

In road construction and other works involving the use of stone, gravel, and the like, the components of the aggregate for each batch of material are proportioned by weight measurement according to engineering specifications from which the maximum allowed working error or departure does not in general practice exceed 4 pounds per thousand. The apparatus for effecting this measurement ordinarily includes a storage bin or hopper having a plurality of compartments each controlled by an operable gate. The gates of the various compartments are manually opened in succession for the delivery of the corresponding contents or components separately to a weighing bin suspended from a rockable lever suitably connected with a weighing mechanism, and heretofore these gates have been manually closed when the weighing mechanism indicates the requisite amount has been deposited in the weighing bin. The opening and closing of the gates for a four-compartment storage bin involves at least 8 operations per batch, viz: four manual opening operations and four manual closing operations. As the continuous operation of a batching plant is extremely monotonous and not conducive to mental alacrity, it is found in practice that the manual closing operations result in the overrun and underrun of the components, which frequently vary from 5 to 10 per cent the total weight of the batch required by the specification, with a variation of plus or minus 10 per cent or more in the proportion of each individual component. Such variation precludes the possibility of the work being completed according to the specification or withstanding the strains for which it was designed, and various methods and devices such as signal bells, dials, etc., have been employed for indicating to the operator or attendant the approach of a full load and enabling him to accurately gauge the proportions of the components. Even with such devices the gate closing operations are dependent entirely on the judgment and alacrity of the operator, and if either is at fault and the gates are closed too late or too soon the overrun or underrun occurs.

The object of my invention, therefore, is to eliminate the human equation in the gate closing operations and provide the apparatus with operable means controlled by the rockable lever for automatically closing the gates and instantaneously stopping the delivery of material to the weighing bin when the weight of its contents balances or overbalances the poise of scale beam.

For an understanding of the invention reference is to be had to the following description and to the accompanying drawings in which:

Fig. 3 is a fragmentary sectional elevation of a storage bin and a mechanism for controlling the delivery from its various compartments;

Fig. 4 is a fragmentary sectional plan view of the parts shown in Fig. 3;

Fig. 5 is a perspective view of a delivery chute and gates suitable for the storage bin;

Fig. 6 is a fragmentary detail view showing the lock for the gate operating mechanism inoperative; Fig. 6ª is a similar view showing it operative;

Fig. 7 is a front elevation of the scale beams governing the action of the weighing lever; and Fig. 8 is a perspective view of the beam box.

Like numerals of reference refer to like parts throughout the specification and drawings.

Figure 1:
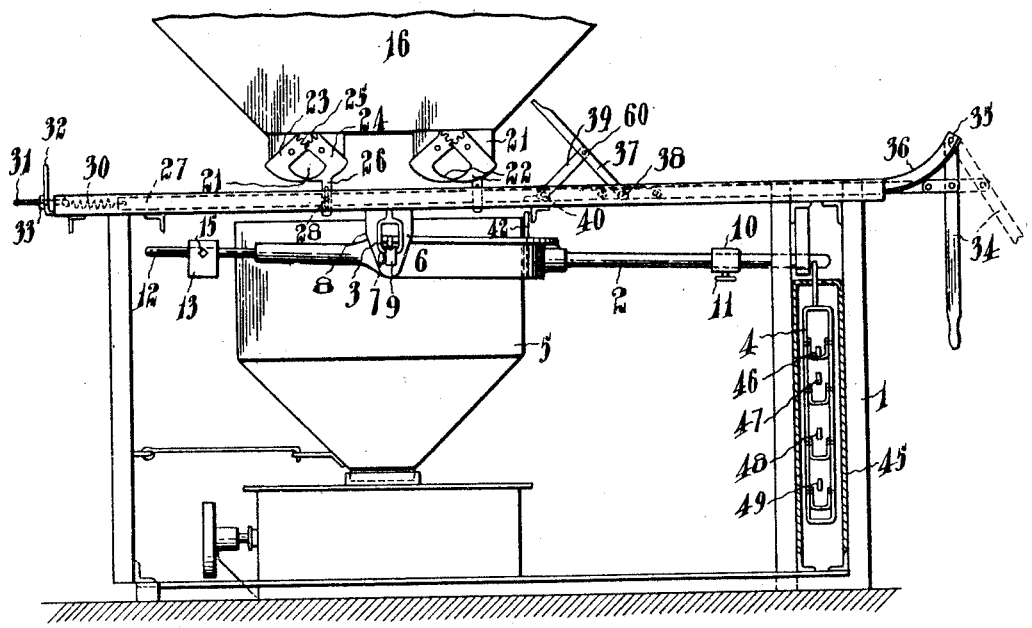
Fig. 1 is an elevation of an apparatus embodying the invention.

In a convenient embodiment of the invention the apparatus includes (a) a framework 1 designed with regard to strength, dimensions, and shape, for the work it is required to perform; (b) a forked lever 2 provided with knife edge pivots or fulcrums 3 mounted in or on the framework; (c) a weighing bin or hopper 5 suspended from and between the forks 6 of the lever; (d) a ladder or set of connected saddles 4 suspended from the free end of the lever; and (e) a scale beam for each component to be weighed.

The pivots or fulcrums 3 as shown in Fig.

Figure 2:
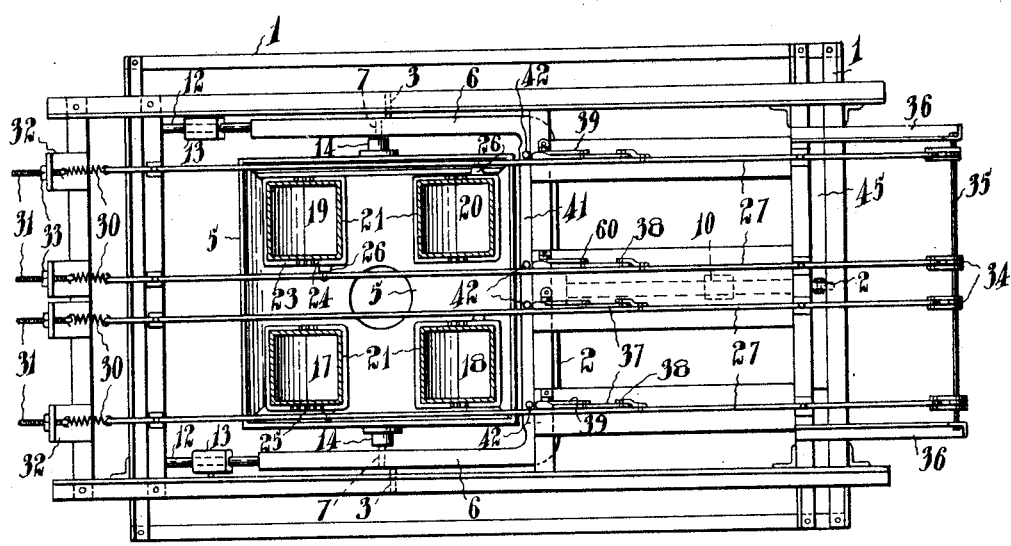
Fig. 2 is a plan view of the parts shown in the preceding figure.

4 project from the outer sides of the forks 6, and the framework as shown in Fig. 3 is provided with hanger plates 8 having bearings 9 on which these pivots or fulcrums are mounted. The lever 2 is provided with pivots or fulcrums 7 which project inwardly from the forks 6 in rear of and eccentric to the pivots or fulcrums 3, and the weighing bin 5 is provided with bearings 14 mounted on them. An adjustable poise 10 is slidable on the lever 2 between the forks 6 and its free end and this poise is locked in its adjusted position by a set screw 11. Extending rearwardly from the forks 6 are rods 12 provided with adjustable counterbalances 13 locked in their adjusted position by set screws 15. Vertically above the weighing bin 5 is a storage bin 16 which, as shown in Fig. 2, consists of four separate compartments 17, 18, 19 and 20. Each compartment of the storage bin 16 is constructed with a chute 21 controlled by a segmental gate 22. The segments of the gate 22 are provided with arms 23 and 24 formed with intermeshing gear teeth 25 for the united movement of the gate segments, and the arm 24 is provided with a slotted crank 26. Between the weighing bin and the storage bin is the gate operating mechanism which comprises four axially movable gate operating rods 27 each provided with a pin 28 entered through the slot 29 of the corresponding crank 26 establishing an operable connection between the gate 22 and its corresponding rod 27. Connected to one end of each rod 27 is one end of a spring 30. The other end of the spring is provided with a tensioning bolt 31 entered through a flange or arm 32 of the framework 1 and provided with a nut 33 for the adjustment of its tension. Pivotally connected to the other end of each rod 27 is a lever 34 fulcrumed at one end on a shaft 35 supported by arms 36 projecting from the framework. The lever 34 is manually moved to the position shown in full lines in Fig. 3 for opening the gate segments and returns under the influence of the spring 30 to the dotted position shown in the same figure for closing them. Each rod 27 is locked in the position shown in full lines in Fig. 3 by a toggle device comprising a lever 37 and a link 39. One end of the lever is free and the other end is connected by a pivot stud 38 to the rod 27. One end of the link 39 is connected by a pivot stud 40 with the framework and the other end is connected to the lever, interjacent its ends by a pivot stud 60. When the lever and link are lowered to the position shown in full lines in Fig. 6ª they operate as a lock for preventing the movement of the rod 27 in the direction indicated by arrow in Fig. 3, and when they assume the position shown in dotted lines in Fig. 6 they permit of the movement of the rod in the direction of the arrow. The yoke 41 of the forks 6 is provided with four upwardly projecting pins 42 respectively positioned below the free ends of the levers 37. Each pin 42 engages the free end of its corresponding lever 37 on the upward movement of the lever 2 and disengages it on the downward movement. Combined with the lever 2 is a scale box 45 comprising four scale beams 46, 47, 48 and 49 corresponding to the compartments 17, 18, 19 and 20, respectively of the storage bin. Each scale beam has an adjustable poise 50 locked in its adjusted position by a set screw 51. Within the scale box are two vertical guide rods 52, between which the free ends of the scale beams are entered. Below each scale beam is a rotatable trip 53 which can be turned to render the scale beam either operative or inoperative. Within the scale box are four connected saddles 4 suspended from the free end of the lever 2 and positioned one below each scale beam. When the trips 53 are turned to hold the scale beams inoperative the saddles are free to rise and fall, during the rocking movement of the lever, without coming into engagement with the scale beams, and when one of the trips is turned to render a scale beam operative such scale beam descends and rests upon its corresponding saddle and holds all the saddles and the free end of the lever 2 in their lowered position.

In the operation of the apparatus each of the compartments 17, 18, 19 and 20 contains a component of the aggregate material. Assuming that the total weight of the aggregate batch is 2000 pounds, composed of 800 pounds of the component in compartment 17, 600 pounds of the component in compartment 18, 400 pounds of the component in compartment 19, and 200 pounds of the component in compartment 20, the poise on scale beam 46 is set at 800 pounds and locked in its set position, the poise on scale beam 47 is set at 600 pounds and locked in its set position, the poise on scale beam 48 is set at 400 pounds and locked in its set position, and the poise on scale beam 49 is set at 200 pounds and locked in its set position. The components of the aggregate are taken in succession from compartments 17, 18, 19 and 20, which would be the convenient order for the operation of the scale beams 46, 47, 48 and 49. The gates of the four compartments are normally closed and remain closed until manually opened as hereinafter described.

The first action of the operator is to turn the trip 53 of the scale beam 46, which immediately descends into engagement with its corresponding saddle 4 and lowers the connected set of saddles and the free end of the lever 2 to the downward limit of movement, imposing on them a weight of 800 pounds.

The next action of the operator is to move the crank or lever 34 from the position shown in dotted lines to the position shown in full lines in Fig. 3, which pulls the rod 27 of the gate actuating mechanism for compartment 17 into the position shown in full lines in the same figure and sets the lever 37 and link 38 in their locking position. This movement of the rod 27 simultaneously opens the gate segments for the delivery of the component in compartment 17 from the storage bin to the weighing bin. When the requisite quantity of this component has been deposited in the weighing bin its weight balances or overbalances the poise on the scale beam 46. The free end of the lever 2, and the connected saddles, then rise instantaneously and lift the scale beam 46. The upward movement of the lever 2 brings a pin 42 into engagement with the free end of the lever 37 and lifts the free end of the lever from the dotted position shown in Fig. 6 thereby breaking the lock. The spring 30 then moves the rod 27 instantaneously in the direction indicated by arrow in Fig. 3, and the movement of the rod 27 in this direction effects the closing of the gate segments with corresponding rapidity for instantaneously shutting off the delivery of any further of the component from compartment 17. To provide for such material as may be in suspension between the closed gate and the weighing bin, test runs can be made to determine the average weight in suspension and the poise of the scale beam can be set back of the actual quantity to the extent of the weight of the average quantity in suspension. The weighing bin, according to the foregoing example, now contains 800 pounds of the component from compartment 17, the gates of all the compartments are closed, and scale beam 46 remains seated on its saddle throughout the subsequent operations of the apparatus.

The next action of the operator is to turn the trip of scale beam 47, for permitting it to descend into engagement with its corresponding saddle. A load of 1400 pounds is now imposed on the free end of the lever 2 which is counterbalanced to the extent of 800 pounds by the material in the weighing bin. Following this action, the operator moves the rod 27, for the gate of compartment 18, into the position shown in full lines in Fig. 3, thereby opening the gate of that compartment and permitting the material to descend to the weighing bin. When 600 pounds of the component from compartment 18 have been delivered to the weighing bin, the lever 2 again rises, releases the locking device and enables the gate actuating mechanism to instantaneously close the gate of that compartment, and the scale beam 47 remains seated on its respective saddle throughout the subsequent operations of the apparatus.

Likewise the scale beams 48 and 49 are released in succession adding their additional loads to the above, and the gates for compartments 19 and 20 are manually opened in succession and automatically closed by the mechanism above described when the requisite quantity of the components contained in those compartments are respectively delivered to the weighing bin.

By this means it is possible to eliminate the human equation in the gate closing part of the operation of the apparatus and measure the quantity of each component within the maximum allowed working error or departure from the engineering specification.

Having thus fully described my invention, what I claim as new and desire to secure by Letters Patent is:

1. An apparatus for proportioning the components of aggregate material by weight measurement, comprising a plurality of scale beams, each operable independently of or unitedly with the others, means for selectively rendering each beam either operative or inoperative, a rockable lever connected with said beams, a weighing bin pivotally suspended from said lever, a storage bin having a plurality of compartments each provided with a gate for controlling the delivery of its contents to the weighing bin, operable means controlled by the lever for automatically closing the gates and instantaneously stopping the delivery of material to the weighing bin when its weight balances or overbalances the poise of the operative scale beam or beams.

2. An apparatus as claimed in claim 1 having means for connecting the scale beams with the rockable lever, and adjustable means for selectively rendering any one, or more of the scale beams inoperative.

3. An apparatus for proportioning the components of aggregate material by weight measurement, comprising a plurality of scale beams, each selectively operable, independently of or unitedly with the others, means for controlling the independent and united action of the beams, a lever connected with said beams, a weighing bin pivotally suspended from said lever, a storage bin, a plurality of gates controlling the delivery of material from the storage bin to the weighing bin, and operable means controlled by the lever for automatically closing the gates and stopping the delivery of material to the weighing bin when the poise, of the operative scale beam or beams, has been upset by the weight of material in the weighing bin.

4. An apparatus for proportioning the components of aggregate material by weight measurement, as claimed in claim 3, provided, with a storage bin comprising a plurality of compartments each having a segmental gate actuated by said operable means.

Dated at Toronto, Ontario, the 27th day of June, 1930.

CLAUDE V. WEIR.